No. 81,264.
W. EMMETT.
LATHE DOG.
PATENTED AUG. 18, 1868.
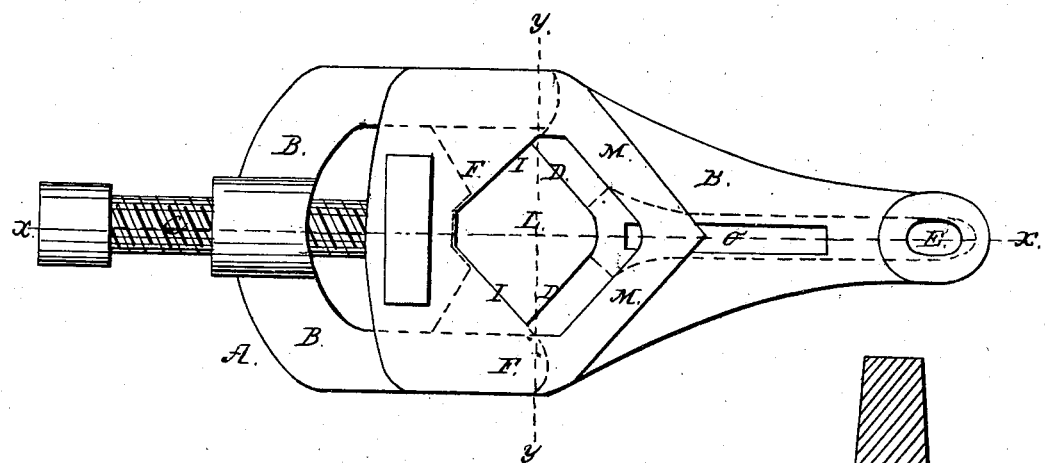
Fig. 2.
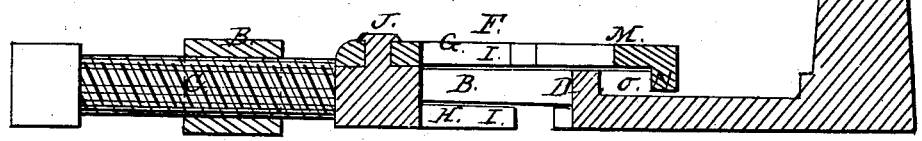
Fig. 3.
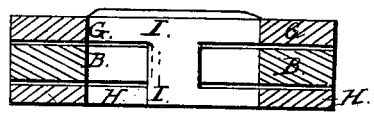
Witnesses:
Albert H. Brown
Herman L. Wattenberg
Inventor,
W. Emmett
his Atty

United States Patent Office.

WILLIAM EMMETT, OF PATERSON, NEW JERSEY, ASSIGNOR TO HIMSELF AND S. E. HORTON, OF WINDSOR LOCKS, CONNECTICUT.

Letters Patent No. 81,264, dated August 18, 1868.

IMPROVEMENT IN LATHE-DOG.

*The Schedule referred to in these Letters Patent and making part of the same.*

TO ALL WHOM IT MAY CONCERN:

Be it known that I, WILLIAM EMMETT, of Paterson, in the county of Passaic, and State of New Jersey, have invented certain new and useful "Improvements in Dogs for Lathes;" and I do hereby declare that the following is a full, clear, and exact description thereof, which will enable others skilled in the art to make and use the same, reference being had to the accompanying drawings, forming part of this specification.

The present invention consists—

First, in providing the frame of the ordinary dog to a lathe with a frame, arranged to play or slide thereon in such manner, with relation thereto, as to have a motion for the entire length, if not beyond the inclined sides of the dog-frame, against which, in the ordinary dog, the article to be turned is pressed, and held by the set-screw of the dog, whereby the dog is rendered more universal in its application, and more certain, sure, and reliable in its hold upon the article placed in it to be turned.

Second, in providing the adjustable slide-frame, hereinabove referred to, for the dog, with angular extension-arms, meeting at a common point in the centre line of the dog, and there, by a lug adapted to move in a guiding-groove or way of the dog-frame, for the purpose of avoiding any lateral play of the adjustable slide-frame upon the dog, as it is moved upon the dog, and imparting a more steady, stiff, strong, and rigid action when grasping the article in the dog.

Third, in constructing the adjustable slide so as to embrace both sides of the dog-frame; and Lastly, in a novel construction, whereby the slide can be applied to and fastened upon the dog, so as to embrace both its sides.

In the accompanying plate of drawings my improvements in dogs for lathes are illustrated—

Figure 1 being a face view of a dog constructed thereto.

Figure 2, a central longitudinal section, taken in the plane of the line $x\,x$, fig. 1.

Figure 3, a transverse section, taken in the plane of the line $y\,y$, fig. 1.

A, in the drawings, represents a dog, formed of a frame, B, provided with set-screw, C, internal angular sides, D, and pinion-shank, E, by which it is hung in the lathe-plate, as in ordinary lathe-dogs.

F, a slide-frame, arranged upon the outside of dog-frame B, which it embraces upon both sides. This frame is made in two parts or plates, G and H, that have similar angular or inclined sides, I, and before being joined together are placed, the one upon the one side of the dog-frame B, and the other upon the other side of the same, with the stud or projection J of the one passing through an opening made in the other to receive it. When upsetting the projecting end of such stud, the two parts will be riveted, as it were, together, and thus firmly joined, or made as one piece.

When the two-part frame F is placed upon the dog-frame B, the angular sides I of each part correspond in position, and are opposite to the angular sides of the dog-frame B, so that if the set-screw C be turned in the proper direction to force the slide-frame F toward the angular sides of the dog-frame A, whatever article may have been placed within the opening L, between its angular sides D and those of the slide, will be firmly held and bound between them, and not only in the direction of the length of the dog, but transversely thereto, as is obvious.

One of the plates to the slide-frame has angular extension-arms, M, meeting in the centre line of the dog, where they are joined or made as one, and have a lug, N, that projects into the centre longitudinal groove O of the dog. By this construction, not only is the slide-frame of the dog stiffened and strengthened, but it can have no side or lateral play—two very important advantages.

With the arrangement of a slide-frame upon the outside of a lathe-dog, as hereinabove explained, in addition to the advantage secured thereby, as before stated, it may be here observed that it enables the dog to be adapted for a greater variety of sizes, as by that arrangement the slide can be passed by the angular sides of the dog, even to their entire length, or, in other words, to the smallest possible distance from their apex, if to receive small articles.

That, furthermore, by means of the general construction of the dog herein described, the weight of metal composing it is enabled to be so disposed that, whatever be the position of the slide upon the dog, the dog will be always evenly balanced, or near enough for all practical purposes—a result of much importance.

And that, furthermore, with the use of my improved dog, no injury can result or occur to any article placed therein, however nicely finished it may be previous to its insertion.

Having thus described my improvements, what I claim, is—

The construction and arrangement of the dog-frame B, having angular sides D, pinion-shank E, and groove O, the set-screw C, sliding frame F, consisting of plates G H, with inclined sides I, stud or projection J, extension-arms M, and lug N, and operating substantially as and for the purpose described.

WILL. EMMETT.

Witnesses:
   AND'W MEAD,
   JACOB BIBBY.